United States Patent

Hsu et al.

(10) Patent No.: US 8,930,014 B2
(45) Date of Patent: Jan. 6, 2015

(54) INTERFERENCE PREVENTING METHOD AND DEVICE

(75) Inventors: Chih-Yuan Hsu, Kaohsiung (TW); Hsin-Chuan Su, Mailiao Township, Yunlin County (TW); Shuo-Peng Liang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 477 days.

(21) Appl. No.: 13/169,684

(22) Filed: Jun. 27, 2011

(65) Prior Publication Data

US 2012/0179286 A1  Jul. 12, 2012

(30) Foreign Application Priority Data

Jan. 12, 2011 (TW) .............................. 100101158 A

(51) Int. Cl.
  *G06F 19/00* (2011.01)
  *B23Q 17/22* (2006.01)
  *G05B 19/4061* (2006.01)

(52) U.S. Cl.
  CPC ........ *B23Q 17/2208* (2013.01); *G05B 19/4061* (2013.01)
  USPC .......................................... 700/178; 700/19

(58) Field of Classification Search
  USPC .................................................. 700/178, 19
  See application file for complete search history.

(56) References Cited

U.S. PATENT DOCUMENTS

| 4,513,366 | A * | 4/1985 | Munekata et al. ............ 700/178 |
| 6,393,362 | B1 | 5/2002 | Burns |
| 6,754,555 | B2 | 6/2004 | Yamato |
| 7,227,328 | B2 | 6/2007 | Haunerdinger |
| 2002/0138200 | A1 | 9/2002 | Gutierrez |
| 2003/0014151 | A1 | 1/2003 | Nigazawa et al. |
| 2005/0010324 | A1 | 1/2005 | Kaever et al. |
| 2008/0021591 | A1 | 1/2008 | Tani et al. |

FOREIGN PATENT DOCUMENTS

| DE | 10085406 | 8/2003 |
| GB | 2227106 | 7/1990 |
| JP | 57-027645 | 2/1982 |
| JP | 62-255050 | 11/1987 |
| JP | 1-175149 U | 12/1989 |

(Continued)

OTHER PUBLICATIONS

Liang, Shuo-Fan, "Value-Added Software Platform and Online Virtual Verification For Five-Axis Machining", Machine Tool Technology Columns, Journal of the Mechatronic Industry, Mar. 2009, pp. 23-24, No. 312.

(Continued)

*Primary Examiner* — Carlos Ortiz Rodriguez
(74) *Attorney, Agent, or Firm* — Muncy, Geissler, Olds & Lowe, P.C.

(57) ABSTRACT

An interference preventing method applied on a machining machine includes the following steps. Firstly, a control command is provided in response to an operation event. Next, protection information corresponding to a protection target component is provided. Then basic envelop of the protection target component is obtained. Then the basic envelop is segmented into a number of sub protection blocks according to a multi-hierarchical protection parameter and sub protection blocks not linked with the protection target component are removed, so as to determine a multi-hierarchical interference protection area. Next, whether an interference event of the multi-hierarchical interference protection area and other components occurs, so as to determine whether interference event of the protection target component occurs; if so, control signal is provided to control the processing operation of the machining machine.

14 Claims, 5 Drawing Sheets

(56) References Cited

FOREIGN PATENT DOCUMENTS

| | | |
|---|---|---|
| JP | 08-112754 | 5/1996 |
| TW | 201006603 A | 2/2010 |
| TW | 201012589 A | 4/2010 |

OTHER PUBLICATIONS

Wang et al., "The Introduction to Turning-Milling Complex Machining Application", Machine Tool Technology Columns, Journal of Mechatronic Industry, Mar. 2009, pp. 29-30, No. 312.

Chen, Zheng-Xiong, "Intelligent Machine Tool Technology", Machinery Monthly Magazine, Mar. 2008, pp. 66-72, vol. 34, No. 3.

Office Action issued by Germany Patent Office on Apr. 20, 2012 with English Translation.

Chunoho, Yi; Wonseop, Kim; Tae Yong, Kim: Improvement of collision detection performance of hierarchies by using dynamic-density of 3D objects based on LOD; Computer Graphics, Imaging and Visualisation:IEEE;2007; 6 pages.

* cited by examiner

INTERFERENCE PREVENTING METHOD AND DEVICE

This application claims the benefit of Taiwan application Serial No. 100101158, filed Jan. 12, 2011, the subject matter of which is incorporated herein by reference.

BACKGROUND

1. Technical Field

The disclosure relates in general to an interference preventing device and method, and more particularly to an interference preventing device and method capable of providing multi-hierarchical interference protection areas.

2. Description of the Related Art

Along with technology changes with each passing days, electronic, sensory, wireless communication, network, and software industries evolve rapidly and various of machining machines have been developed for enhancing efficiency in the corresponding industries. For example, intelligence technology of machining machine has been realized and vastly applied in machining machines, e.g. multiple-axis machining center and multi-tasking machining center by many international industry giants. In general, the multiple-axis machines are regarded as high end machinery for high unit price products, e.g. aero-industries, automobile, or 3C components with high added value.

In the present skill, product operation curved surfaces of multiple-axis systems are generally much more complicated than three-axis machines and components damage or cutting tools failure are often encountered in multiple-axis systems. Thus, how to provide an interference preventing method for the internal components of multiple-axis machine has become a prominent goal for the industries.

SUMMARY

The disclosure is directed to an interference preventing device and method. In comparison to conventional interference preventing device, the interference preventing device and method directed to by the disclosure are advantageously capable of providing multi-hierarchical interference protection areas for protection target components of a machining machine system.

According to a first aspect of the present disclosure, an interference preventing device for a machining machine is provided. The interference preventing device includes a parameter database module and a control module. The parameter database module provides protection information corresponding to a target component of the machining machine in response to a control command. The control module provides a control command in response to an operation event and obtains a basic envelope of the target component by executing envelop calculation for the target component according to the protection information. The control module further obtains a multi-hierarchical area by having the basic envelope segmented into a plurality of sub-areas according to a multi-hierarchical protection parameter and removes a part of the plurality of sub-areas not interlaced with the target component. The control module determines whether an interference event has occurred between the multi-hierarchical area and a correlated object, so as to determine whether an interference event occurs on the target component and provide a control signal to control the operation of the machine when the interference event is detected.

According to a second aspect of the present disclosure, an interference preventing method for achieving interference protection operations of a machining machine is provided. The interference preventing method comprises the following steps of: providing a control command in response to an operation event; providing protection information corresponding to a target component of the machining machine in response to the control command; executing envelope calculation of the target component according to the protection information, so as to obtain a basic envelope; obtaining a multi-hierarchical area by having the basic envelope segmented into a plurality of sub-areas according to a multi-hierarchical protection parameter and removing a part of the plurality of sub-areas not interlaced with the target component; determining whether an interference event has occurred between the multi-hierarchical area and a correlated object, so as to determine whether an interference event occurs on the target component; and when the interference event is detected, providing a control signal to control the operation of the machining machine.

The above and other aspects of the disclosure will become better understood with regard to the following detailed description of the non-limiting embodiment(s). The following description is made with reference to the accompanying drawings.

DETAILED DESCRIPTION

The interference preventing device and method directed by the disclosure provides multi-hierarchical interference protection areas for protection target components of a machining machine system.

Figure 1:
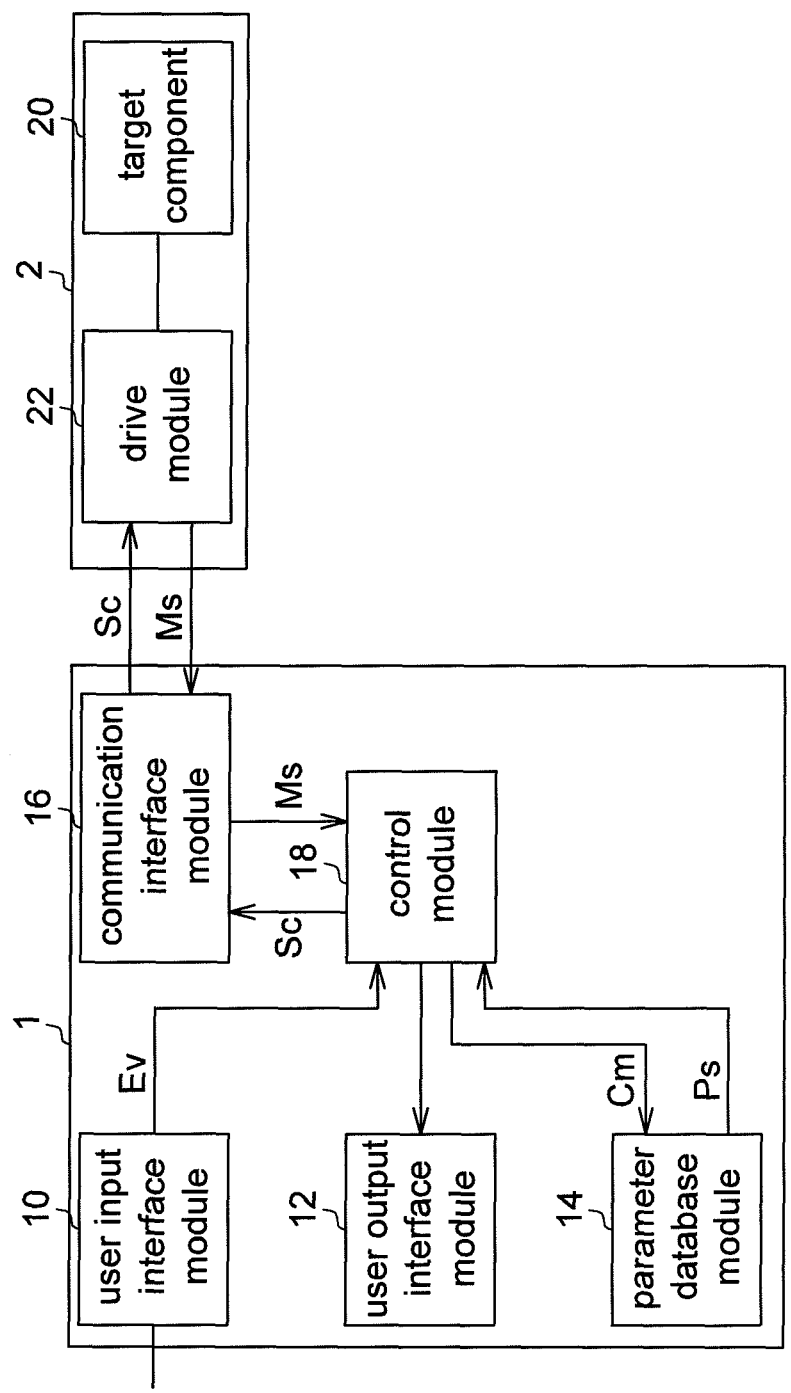
FIG. 1 is a block diagram of an interference preventing device according to the present embodiment of the disclosure.

Referring to FIG. 1, a block diagram of the interference preventing device according to an embodiment is shown. The interference preventing device 1 achieves interference protection of a target component 20 of a machining machine 2. For example, the machining machine 2 is a multiple axes machining machine, and the target component 20 is a component, e.g. cutting tool, spindle, and correlated component of machine.

The interference preventing device 1 includes a user input interface module 10, a user output interface module 12, a parameter database module 14, a communication interface module 16, and a control module 18.

The user input and the user output interface modules 10 and 12 are employed as user operation interface, such that a user can accordingly interact with the interference preventing device 1 and execute corresponding control operation. The user input interface module 10 triggers an operation event Ev in response to a control operation of the user, and the control module 18 generates a control command Cm in response to the operation event Ev. For example, the user input interface module 10 includes a keyboard, a touch pad, a trackball, and other user input interface devices; and the user output interface module 12 includes a video graphic array (VGA) circuit and a display, a speaker, and other user output interface devices.

The parameter database module 14 obtains protection information Ps, e.g. corresponding to the target component 20 of the machining machine 2, in response to the control command Cm. For example, the protection information Ps includes exterior dimensional information of the target component 20.

Figure 2:
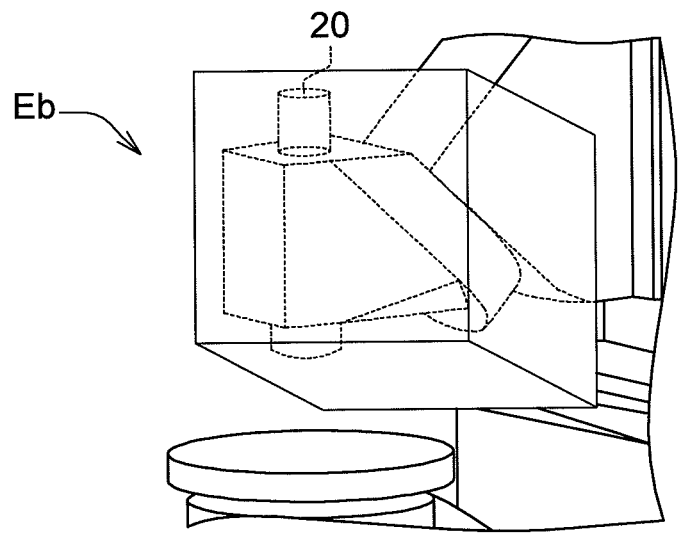
FIG. 2 is a 3-dimensional illustration of the target component 20 of FIG. 1 and its basic envelope Eb.

The control module 18 obtains a basic envelope Eb of the target component 20 by executing envelope calculation for the target component 20 according to the protection information Ps. For example, axis aligned bounding box (AABB) algorithm is employed by the control module 18 for the envelope calculation, and a three dimensional illustration for the basic envelope Eb and the target component 20 is shown in FIG. 2.

The control module 18 further obtains a multi-hierarchical area Eh by having the basic envelope Eb segmented into multiple sub-areas according to a multi-hierarchical protection parameter Ph and removing a part of the sub-areas not interlaced with the target component 20.

In an embodiment, the control module 18 obtains the multi-hierarchical protection parameter Ph by looking up a table with a feed rate of the machining machine 2, wherein the table is, for example, stored in the parameter database module 14. For example, the higher the feed rate of the machining machine 2 is, the lower the value of the multi-hierarchical protection parameter Ph is; and the lower the feed rate of the machining machine 2 is, the higher the value of the multi-hierarchical protection parameter Ph is.

In still another embodiment, the control module 18 obtains the multi-hierarchical protection parameter Ph by looking up a table with a distance between the target component 20 and a correlated object, e.g. other interior components of the machining machine 2, wherein the table is, for example, stored in the parameter database module 14. For example, the greater the distance is, the lower the value of the multi-hierarchical protection parameter Ph is; and the smaller the distance is, the higher the value of the multi-hierarchical protection parameter Ph is.

Figure 3:
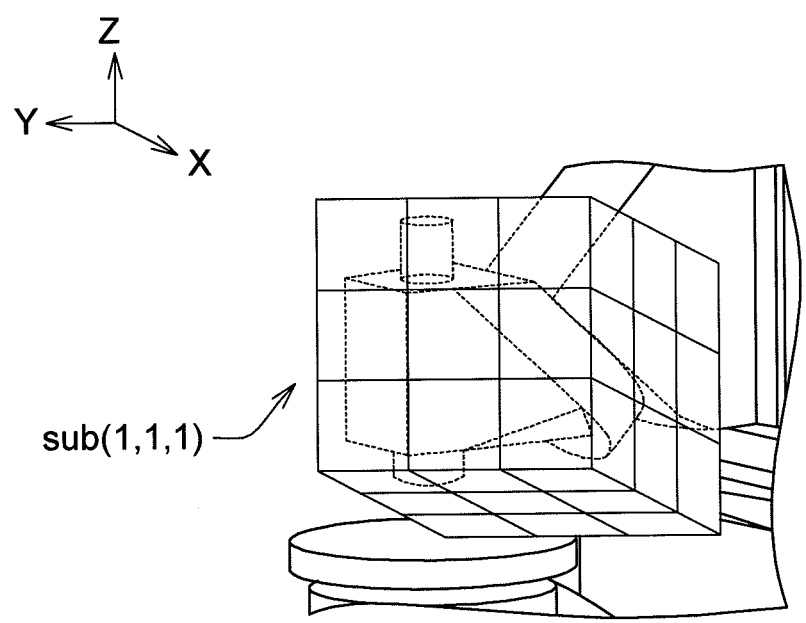
FIG. 3 is a 3-dimensional illustration of a multi-hierarchical area Eh.

The control module 18 has each sides of the basic envelope Eb segmented into Ph parts, so as to accordingly obtain the sub-areas. In other words, the higher the value of the multi-hierarchical protection parameter Ph has, the smaller sub-areas, segmented from the basic envelope Eb by the control module 18, will be; the lower the value of the multi-hierarchical protection parameter Ph has, the greater sub-areas, segmented from the basic envelope Eb by the control module 18, will be. In an embodiment, the multi-hierarchical protection parameter Ph has a value of 3, and each sides of the basic envelope Eb is segmented into 3 parts by the control module 18, so that the basic envelope Eb is segmented in 27 sub-areas sub(1,1,1), sub(1,1,2), sub(1,1,3), sub(1,2,1), . . . , and sub(3, 3,3), as depicted in FIG. 3.

More specific, some of the 27 sub-areas, from sub(1,1,1) to sub(3,3,3), e.g. the sub-area sub(1,1,1), are not interlaced with the target component 20 and only some of the 27 sub-area, from sub(1,1,1) to sub(3,3,3), e.g. the sub-area sub(2,2, 1), are interlaced with the target component 20. In the embodiment depicted in FIG. 3, the sub-areas sub(2,1,2), sub(2,2,2), sub(2,2,1), sub(2,3,2), and sub(2,2,3) are interlaced with the target component 20 and accordingly form the multi-hierarchical area Eh, while the rest of the sub-areas, not interlaced with the target component 20, are accordingly removed.

The control module 18 receives motion information Ms, e.g. machine coordinate and feed rate of motion axes of the machining machine, via the communication interface module 16, so as to obtain corresponding positions of the related components within the machining machine 2 and accordingly determine whether the multi-hierarchical area Eh interferes with a correlated object and whether an interference event of occurs on the target component 20. For example, the correlated object is an interior component of the machining machine. When the multi-hierarchical area Eh interferes with the correlated object, the control module 18 provides a control signal Sc through the communication interface module 16 for controlling machining operations of the machining machine 2, e.g. controlling a drive module 22 of the machining machine 2 stops the machining operations of the machining machine 2, so as to avoid real interference of the target component 20.

Figure 4:
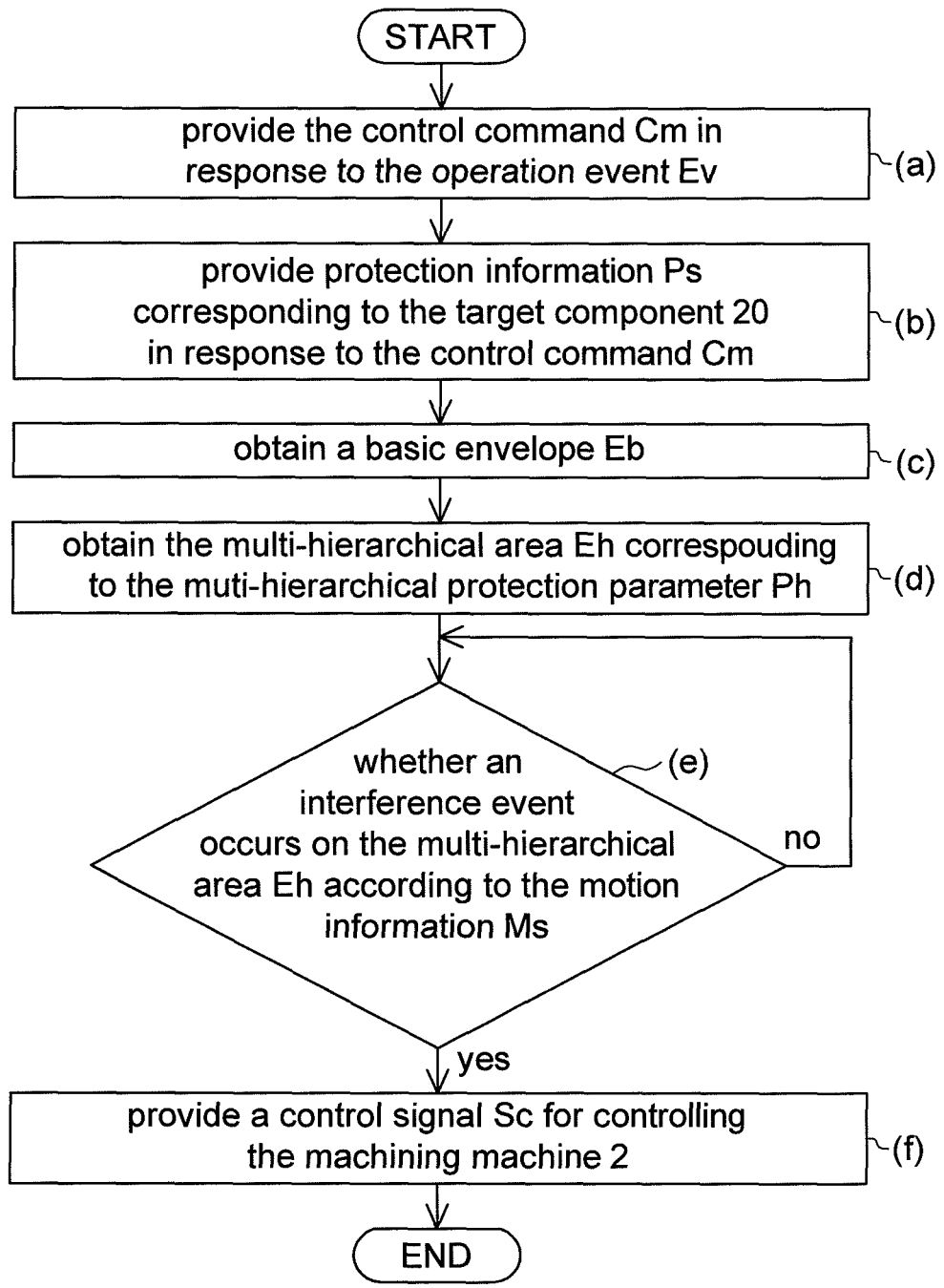
FIG. 4 is a flow chart of an interference preventing method according to the present embodiment of the disclosure.

Referring to FIG. 4, a flow chart of the interference preventing method according to the present embodiment of the disclosure is shown. The interference preventing method according includes the following steps. Firstly, as shown in step (a), the control module 18 provides the control command Cm in response to the operation event Ev. Next, as shown in step (b), the parameter database module 14 provides protection information Ps corresponding to the target component 20 of the machining machine 2 in response to the control command Cm.

Then as shown in step (c), the control module 18 executes envelope calculation of the target component 20 according to the protection information Ps, so as to obtain a basic envelope Eb. Next, as shown in step (d), the control module 18 obtains the multi-hierarchical area Eh by having the basic envelope Eb segmented into the sub-areas according to the multi-hierarchical protection parameter Ph and removing a part of the sub-areas not interlaced with the target component 20.

Then as shown in step (e), the control module 18 determines whether the interference event has occurred between the multi-hierarchical area Eh and the correlated object according to the motion information Ms, so as to determine whether an interference event occurs on the target component 20. When the interference event is detected, the method proceeds to step (f), in which the control module 18 provides a control signal Sc for controlling the machining operation of the machining machine 2.

Though only the situation that the control module 18 obtains the multi-hierarchical area Eh according to the multi-hierarchical protection parameter Ph and the basic envelope Eb, the control module 18 is not limited thereto, and can further refer to other information in shaping the envelope for the target component 20. In other example, the control module 18 further determines a size of the basic envelope Eb, so as to provide the multi-hierarchical area En', which is dynamic adjustable, for the target component 20 according to the dynamic protection parameter Pd.

Figure 5:
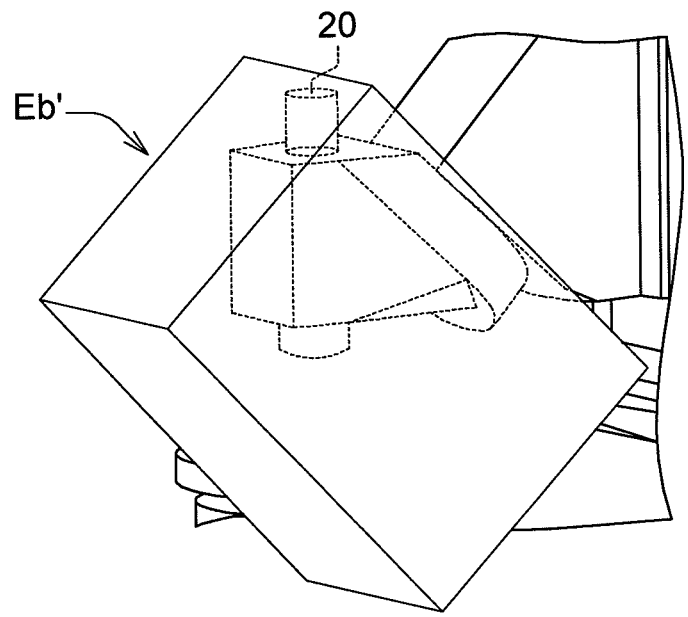
FIG. 5 is a 3-dimensional illustration of the target component 20 of FIG. 1 and its basic envelope Eb'.
Figure 6:
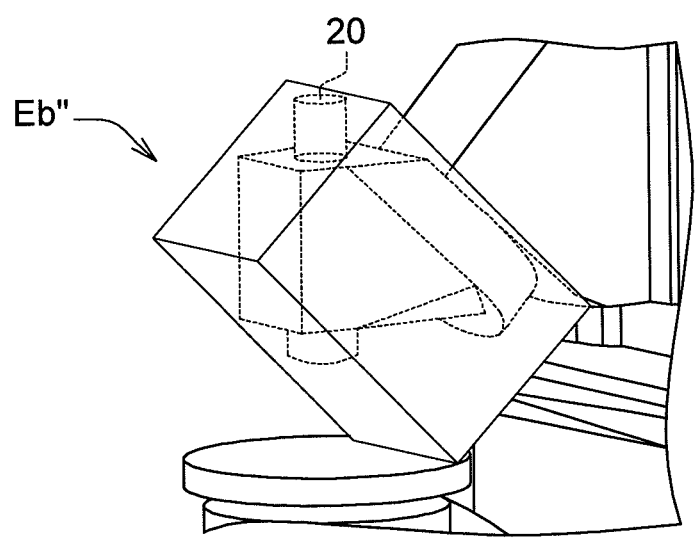
FIG. 6 is a 3-dimensional illustration of the target component 20 of FIG. 1 and its basic envelope Eb''.

In more detail, similar to the operation of shaping the basic envelope Eb according to the multi-hierarchical protection parameter Ph, the control module 18 obtains the dynamic protection parameter Pd by looking up a table with the feed rate of the machining machine 2 and the distance between the target component 20 and the correlated object, wherein the table is, for example, stored in the parameter database module 14. For example, the higher the feed rate of the machining machine 2 or the greater the distance are, the higher the value of the dynamic protection parameter Pd is, so as to have the basic envelope Eb corresponding to a larger size, as depicted by the basic envelope Eb' of FIG. 5. Besides, the lower the feed rate of the machining machine 2 or the smaller the distance are, the smaller the value of the dynamic protection parameter Ph is, so as to have the basic envelope Eb corresponding to a smaller size, as depicted by the basic envelope Eb" of FIG. 6. After that, segmentation of the dynamic adjusted basic envelope Eb' or Eb" according to the multi-hierarchical protection parameter Ph and removal of the sub-areas not interlaced with the target component 20, as discussed in previous paragraphs, is then applied, so as to obtain a dynamic adjustable, multi-hierarchical area.

Though only the situation that the control module 18 carries out the corresponding interference protection operation in response to the operation event Ev provided by the user input interface module 10, the interference preventing device 1 is not limited thereto, and can further carry out the interference protection operation in response to other kinds of events provided by other kinds of input interface devices.

Figure 7:
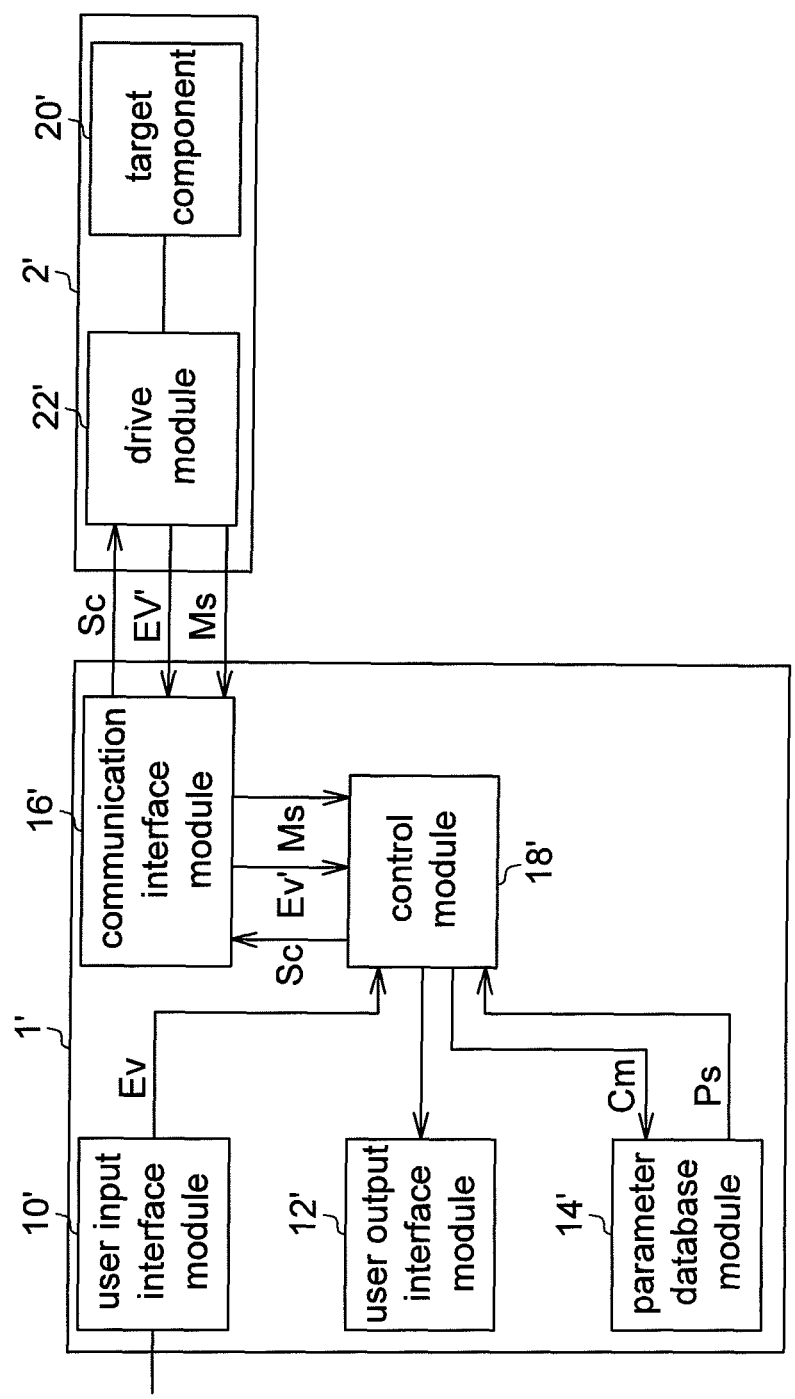
FIG. 7 is another block diagram of the interference preventing device according to the present embodiment of the disclosure.

In an example, the machining machine 2' further provides identification information for triggering an operation event Ev', after a communication link has been established between the machining machine 2' and the interference preventing device 1', as depicted in FIG. 7. For example, the identification information includes model information of the machining machine 2', shape information and position information of the target component 20' thereof, and so forth. Thus, the control module 18' can accordingly driving the rest of modules of the interference preventing device 1' carrying out the corresponding operation sequences, as discussed in previous paragraphs, in response to the operation event Ev'.

The interference preventing device according to the present embodiment generates a multi-hierarchical area or dynamic adjustable area by shaping a basic envelope of a target component of a machining machine according to a multi-hierarchical protection parameter and a dynamic protection parameter, corresponding to a feed rate of the machining machine and a distance between a target component and a correlated object, so as to achieve interference protection operation of the target component. Thus, in comparison to conventional interference preventing device, the interference preventing device and method according to the present embodiment of the disclosure are advantageously capable of providing multi-hierarchical interference protection areas or with dynamic adjustable size for protection target components of a machining machine system.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An interference preventing device for a machining machine, comprising:
    a parameter database module, providing protection information corresponding to a target component of the machining machine in response to a control command; and
    a control module, providing the control command in response to an operation event, the control module further obtaining a basic envelope of the target component by executing envelop calculation for the target component according to the protection information, and the control module further obtaining a multi-hierarchical area by having the basic envelope segmented into a plurality of sub-areas according to a multi-hierarchical protection parameter and removing a part of the plurality of sub-areas not interlaced with the target component, wherein,
    the control module determines whether an interference event has occurred between the multi-hierarchical area and a correlated object, so as to determine whether an interference event occurs on the target component and provide a control signal to control the operation of the machine when the interference event is detected;
    the control module further determines a size of the basic envelope according to a dynamic protection parameter corresponds to distance information indicating a distance between the target component and the correlated object, so as to provide the multi-hierarchical area, which is dynamic adjustable, for the target component according to the dynamic protection parameter; wherein
    the greater the distance between the target component and the correlated object is, the higher a value of the dynamic protection parameter is, and a larger size of the basic envelope corresponds to, while the smaller the distance between the target component and the correlated object is, the smaller the value of the dynamic protection parameter is, and a smaller size of the basic envelop corresponds to.

2. The interference preventing device according to claim 1, further comprising:
    a user input interface module, for triggering the operation event; and
    a user output interface module, controlled by the controller module for displaying an operation of interference detection of the control module.

3. The interference preventing device according to claim 1, wherein the multi-hierarchical protection parameter corresponds to a feed rate information of the machining machine.

4. The interference preventing device according to claim 1, wherein the multi-hierarchical protection parameter corresponds to distance information indicating a distance between the target component and the correlated object.

5. The interference preventing device according to claim 1, wherein the dynamic protection parameter corresponds to feed rate information indicating a feed rate of the machining machine.

6. The interference preventing device according to claim 1, further comprising:
    a communication interface module, connected to the machining machine, for providing the control signal provided by the control module to the machining machine, so as to control the operation of the machine.

7. The interference preventing device according to claim 1, further comprising:
    a communication interface module, connected to the machining machine, for providing information indicating machine coordinate and feed rate of motion axes of the machining machine to the control module, and triggering the operation event in response to identification information provided by the machining machine.

8. The interference preventing device according to claim 1, wherein the protection information comprises exterior dimensional information of the target component.

9. An interference preventing method, for achieving interference protection operations of a machining machine, comprising:
    providing a control command in response to an operation event;

providing protection information corresponding to a target component of the machining machine in response to the control command;

executing envelope calculation of the target component according to the protection information, so as to obtain a basic envelope;

determining a size of the basic envelope according to a dynamic protection parameter corresponds to distance information indicating a distance between the target component and a correlated object, so as to provide a multi-hierarchical area, which is dynamic adjustable, for the target component according to the dynamic protection parameter; wherein the greater the distance between the target component and the correlated object is, the higher a value of the dynamic protection parameter is, and a larger size of the basic envelope corresponds to, while the smaller the distance between the target component and the correlated object is, the smaller the value of the dynamic protection parameter is, and a smaller size of the basic envelop corresponds to;

obtaining the multi-hierarchical area by having the basic envelope segmented into a plurality of sub-areas according to a multi-hierarchical protection parameter and removing a part of the plurality of sub-areas not interlaced with the target component;

determining whether an interference event has occurred between the multi-hierarchical area and the correlated object, so as to determine whether an interference event occurs on the target component; and when the interference event is detected, providing a control signal to control the operation of the machine.

10. The interference preventing method according to claim 9, further comprising:

displaying an operation of interference detection of the control module.

11. The interference preventing method according to claim 9, wherein the multi-hierarchical protection parameter corresponds to a feed rate of the machining machine.

12. The interference preventing method according to claim 9, wherein the multi-hierarchical protection parameter corresponds to distance information indicating a distance between the target component and the correlated object.

13. The interference preventing method according to claim 9, wherein the dynamic protection parameter corresponds to feed rate information indicating a feed rate of the machining machine.

14. The interference preventing method according to claim 9, wherein the protection information comprises exterior dimensional information of the target component.

* * * * *